W. H. SHAFFER.
LARD AND BUTTER CUTTER.
APPLICATION FILED DEC. 13, 1920.
1,390,170.
Patented Sept. 6, 1921.
2 SHEETS—SHEET 1.
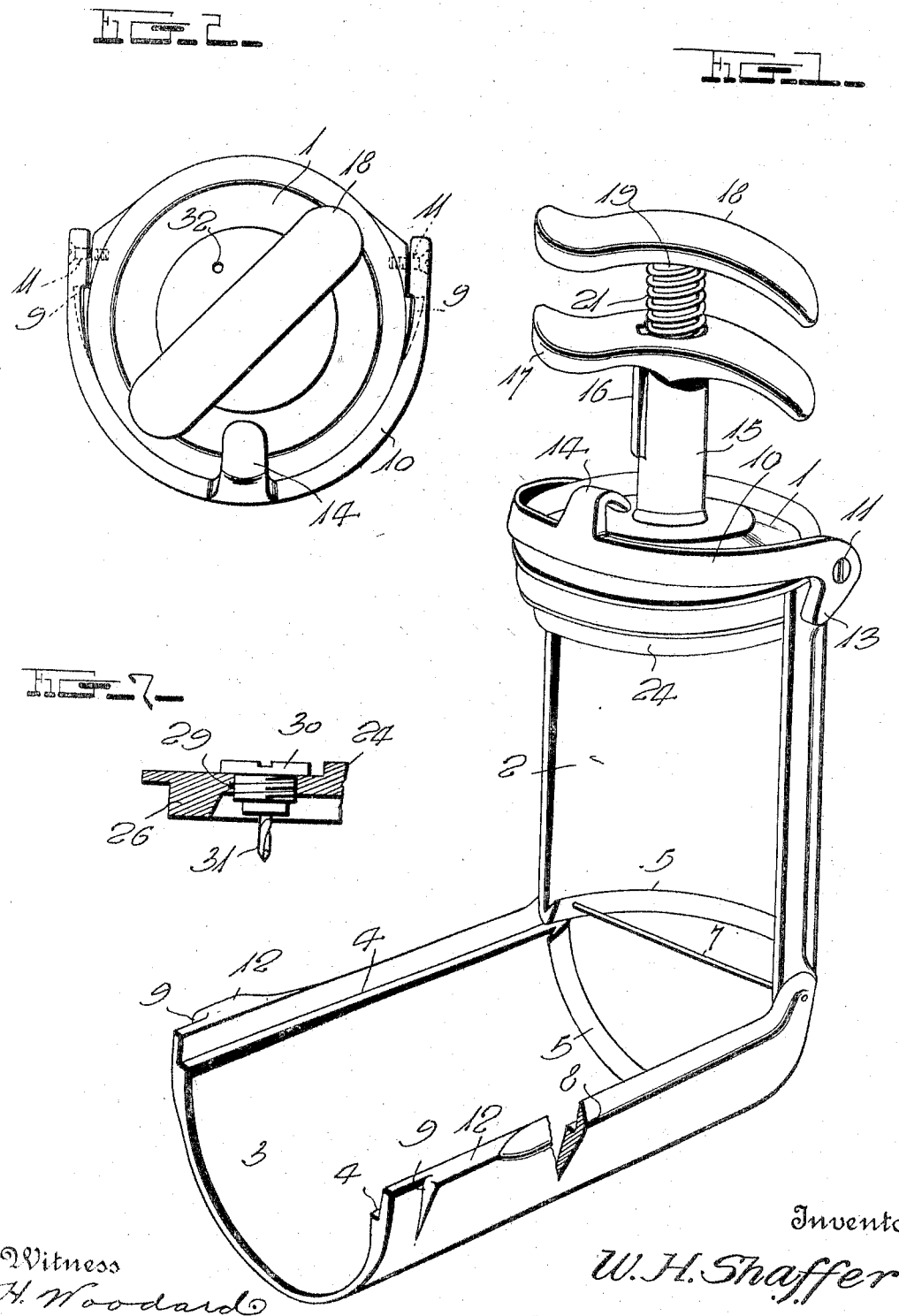
Witness
H. Woodard
Inventor
W. H. Shaffer
By H. B. Willson & Co.
Attorneys W. H. SHAFFER.
LARD AND BUTTER CUTTER.
APPLICATION FILED DEC. 13, 1920.
1,390,170.
Patented Sept. 6, 1921.
2 SHEETS—SHEET 2.
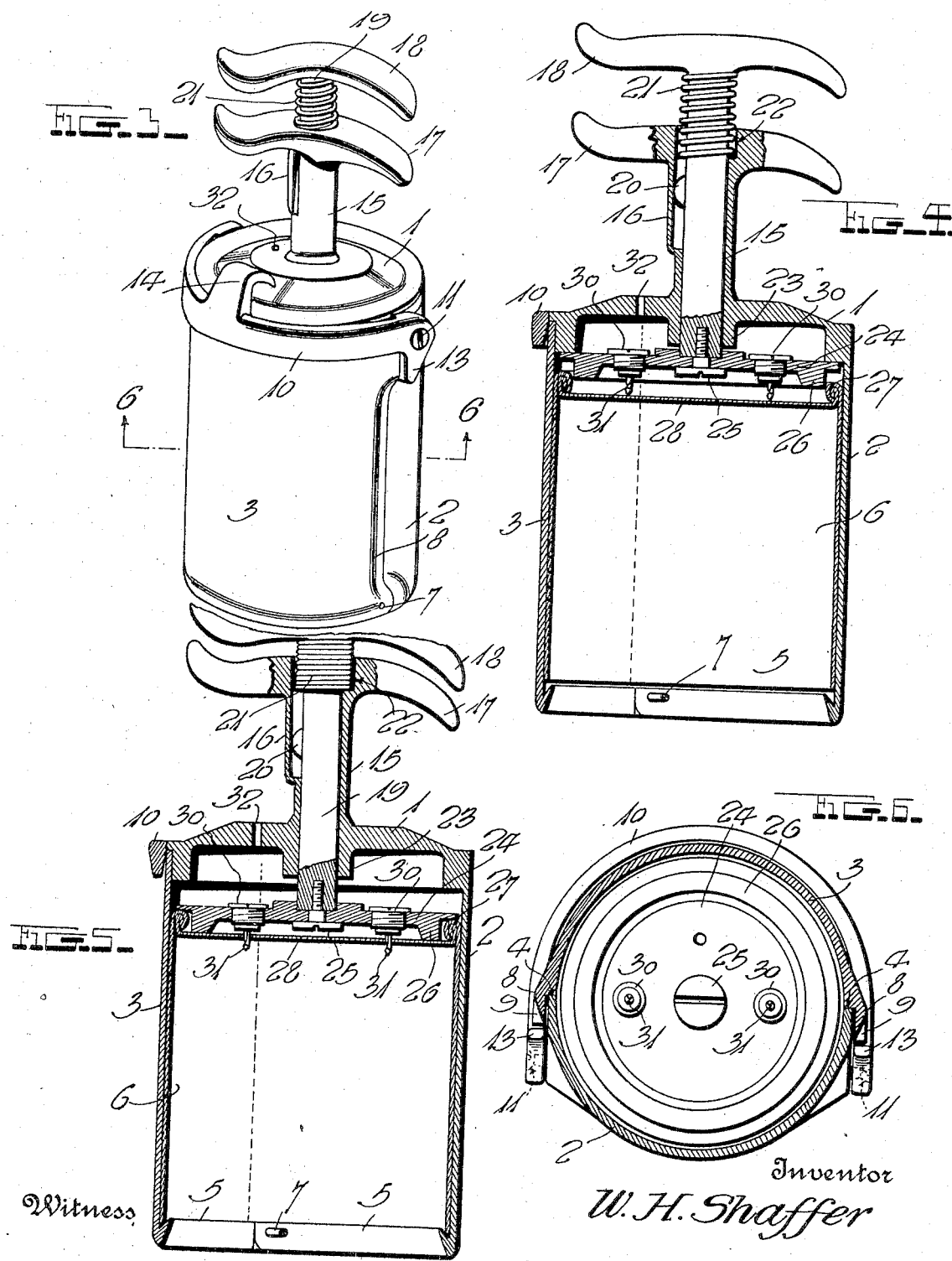
Inventor
W. H. Shaffer

UNITED STATES PATENT OFFICE.

WILLIAM H. SHAFFER, OF CUMBERLAND, MARYLAND.

LARD AND BUTTER CUTTER.

1,390,170.

Specification of Letters Patent.   Patented Sept. 6, 1921.

Application filed December 13, 1920. Serial No. 430,342.

*To all whom it may concern:*

Be it known that I, WILLIAM H. SHAFFER, a citizen of the United States, residing at Cumberland, in the county of Allegany and State of Maryland, have invented certain new and useful Improvements in Lard and Butter Cutters; and I do declare the following to be a full, clear, and exact description of the invention, such as will enable others skilled in the art to which it appertains to make and use the same.

This invention relates to an improved lard and butter cutter and is an improvement over the structure shown in lard and butter cutters of the type disclosed by the U. S. Patent No. 1,065,108 patented June 17, 1913. One object of the invention is to provide a lard and butter cutter having improved means for releasably holding the movable wall section in a raised or closed position, the securing means being so constructed that when swung to an inoperative position, the movable wall will be moved toward an open position.

Another object of the invention is to provide the improved butter and lard cutter with improved receptacle engaging means mounted upon the inner end portion of a plunger for engagement with the bottom of a receptacle placed in the cutter.

Another object of the invention is to so connect the receptacle engaging plate or disk with the plunger that the plunger may turn with the receptacle engaging disk held stationary.

Another object of the invention is to so construct this receptacle engaging disk that cutters may be carried thereby for puncturing the bottom of the receptacle when the disk is brought into engagement with the receptacle to force the receptacle firmly upon the receptacle seat of the body portion of the cutter.

Another object of the invention is to so construct the movable wall section of the tubular cutter body that the end portions thereof which overlap the end portions of the stationary wall section will form cam surfaces which will tend to force the mass of lard or butter away from the walls of the cutter when the cutter is thrust into the mass of lard or butter and the cutter then turned to cut loose the portion of lard or butter within the receptacle carried by the butter.

Another object of the invention is to so construct this cutter that the puncturing devices when passed through the bottom of the receptacle will leave air passages thus permitting air to escape from the receptacle while the puncturing devices are positioned in the openings formed thereby.

Another object of the invention is to so construct the puncturing devices that they may be easily and quickly removed from the receptacle engaging disk and either sharpened or new ones put in place.

Another object of the invention is to so construct this cutter that the principal portions thereof may be taken apart thus permitting thorough cleaning of the cutter when necessary.

This invention is illustrated in the accompanying drawings, wherein:

Figure 1 is a perspective view of the improved butter cutter with the movable wall section in an open position.

Fig. 2 is a top plan view of the improved butter cutter.

Fig. 3 is a perspective view of the improved butter cutter in the closed position.

Fig. 4 is a vertical sectional view through the cutter showing the position of the receptacle before the receptacle is forced down upon its seat.

Fig. 5 is a view similar to Fig. 4 showing the receptacle forced down upon its seat and the puncturing devices penetrating the bottom of the receptacle.

Fig. 6 is a transverse sectional view taken along the line 6—6 of Fig. 3.

Fig. 7 is an enlarged fragmentary sectional view showing the construction and mounting of one of the puncturing devices.

This improved lard and butter cutter is provided with a tubular body which is open at one end and provided with a head 1 and a wall structure having a stationary section 2 and a movable section 3, the side portions of which extend in overlapping relation to the side portions of the stationary wall section and are cut to provide seats 4 into which will fit the side portions of the stationary wall section as shown in Fig. 6. These wall sections are provided with internal flanges 5 which extend upwardly to provide supporting means for an open ended receptacle 6 and the movable wall section is pivotally connected with the stationary wall sections by a cross rod or pivot pin 7 which extends through the wall sections and transversely through the tubular body adjacent the open end thereof. It will thus be seen that the wire will constitute a butter cutter which will serve to sever the portion of the butter within the receptacle from the mass of butter in a tub or other container when the device is thrust into a mass of butter and then turned as will be hereinafter brought out. It will be further noted that the walls taper to a relatively sharpened cutting edge at the open end as shown in Fig. 5 and also in Fig. 4 thus permitting the device to be easily thrust into the mass of butter or lard. The side portions of the movable wall section are thickened outwardly as shown in Fig. 6 thus providing strips 8 which are beveled in opposite directions as shown in this figure thus providing cam surfaces for a purpose to be hereinafter brought out. From an inspection of Fig. 1, it will be seen that the side ribs 8 terminate short of the upper or free end of the movable wall section thus providing supporting shoulders 9 for a substantially U-shaped latching yoke 10 which extends transversely about the head 1 and has its end portions pivotally connected with the stationary walls or opposite side portions of the head as shown at 11. It will be further noted that adjacent the shoulders 9, the side portions of the movable wall section are provided with straight cut edge faces thus providing abutment faces 12 for engagement by the cam extensions or fingers 13 which extend from the pivoted ends of the latching yoke 10. Therefore, when this latching yoke is swung upwardly by means of the finger engaging hooks 14 from the position shown in Fig. 3 to that shown in Fig. 1, the cam fingers 13 through engagement with the abutment faces 12 will tend to swing the movable wall section toward the open position thus permitting this movable wall section to be very easily swung downwardly to the open position shown in Fig. 1.

The head 1 of this cutter is provided with a hollow or tubular neck 15 which is provided with an internal longitudinally extending side pocket 16 and terminates in a handle 17 positioned beneath the handle 18 of a plunger 19 which slidably passes through the hollow or tubular neck 15 and is provided with a lug 20 which fits into the pocket 16 and permits the plunger to slide freely but prevents rotation of the plunger in the neck. A spring 21 is placed about this plunger with its upper end engaging the handle 18 and its lower end fitting into a seat or pocket 22 formed in the handle 17 and this spring serves as means to yieldably retain the plunger in the raised position as shown in Fig. 4. This plunger extends into the tubular body through the internal boss 23 carried by the head 1 and a disk 24 is swiveled to the inner end of the plunger by means of a swivel bolt or screw 25 which securely connects the disk with the inner end of the plunger but permits this disk to be held stationary when the plunger is rotating with the cutter. This disk is provided with an annular flange 26 for engaging the bottom of the receptacle 6 with the edge portions of the disk engaging the rolled joints 27 of the receptacle 6 and it will thus be seen that when the device is in use, the disk will not only engage the rolled joints of the receptacle 6 but will also engage the bottoms 28 thereof.

When this device is in use, it is necessary to puncture the bottom 28 of the receptacle 6 so as to permit air to pass out of the receptacle and the receptacle is filled with the lard or butter. The receptacle engaging disk 24 has therefore been provided with threaded openings 29 in which will be screwed removable blocks or studs 30 having auger bits 31 carried thereby. By having the puncturing devices in the form of auger bits, the openings will be formed in the bottom of the receptacle and the spiral grooves of the augers will provide air passages so that air may pass out of the receptacle through the openings with the puncturing devices still positioned in the openings. It will thus be seen that when the receptacle is to be filled with lard or butter, it will be placed in the open body of the cutter and the movable wall will then be swung to the closed position of Fig. 3 and the latching yoke will be swung down to firmly engage the upper end portion of the movable wall section and secure the wall section in the closed position. The plunger will then be forced inwardly and the disk will engage the bottom portion of the receptacle and force the receptacle tight against the supporting flange or seat 5. The puncturing bits 31 will cut through the bottom 28 thus forming the air outlet openings so that air may pass out of the receptacle and into the upper portion of the tubular body from which it will pass through the outlet opening 32. After the cutter has been forced into the mass of butter contained in a tub or other similar container, the cutter may be turned with the plunger still held in the position shown in Fig. 5 or the plunger may be permitted to return to the raised position of Fig. 4 and the cutter then turned. By having the disk 24 connected with the inner end of the plunger by means of a swivel connection, the cutter may be rotated without the disk rotating with it and therefore there will be no danger of the bottom of the receptacle being torn as the receptacle and the disk will remain stationary. Turning of the cutter in the mass of butter will cause the pivot rod 7 to cut the butter within the receptacle from the main mass of butter in the butter tub. As the cutter is rotated, the cam faces of the side ribs 8 will cause the mass of butter about the cutter to be forced away from the walls of the cutter, thus permitting the cutter to be easily withdrawn from the tub. When the cutter is removed from the tub, the hooks 14 will be engaged by one finger and drawn upwardly to raise the latching yoke 10. As this latching yoke moves to the releasing or inoperative position, the cam fingers 13 will engage the abutment faces 12 and force the movable wall section toward the open position thereby permitting the movable wall section to be easily swung to the open position of Fig. 1. The filled receptacle can then be very easily removed from the cutter and a new receptacle put in place. It will thus be seen that there has been provided a butter and lard cutter which will be very efficient in operation and which will be so constructed that there will be no danger of an air pocket being formed in the upper portion of the receptacle which is to be filled with the lard or butter. It will be further noted that when it is desired to thoroughly clean this cutter, it is simply necessary to remove the screws which pivotally mount the latching yoke and swivel screw 25 thus releasing the yoke from the head or stationary wall section and releasing the disk so that the disk can be removed from within the tubular body of the cutter and the plunger together with the spring 21 drawn outwardly. The blocks 30 can then be unscrewed from the disk and the bits 31 sharpened or new ones put in place in case they have been worn out or broken.

I claim:

1. A receptacle holding and plastic cutting device comprising a tubular body open at one end and having a head at its second end, the wall portion of the body having a stationary section and a movable section pivotally connected with the stationary section, securing means for releasably holding the movable section in an operative position, and means carried by the securing means for moving the movable wall section toward an open position when the securing means is moved to release the movable wall section.

2. A device of the character described comprising a tubular body having a head at one end, the wall portion of the body having a longitudinally extending stationary section rigid with the head and a longitudinally extending movable section free from the head for movement into and out of a closed position, movably mounted securing means for releasably holding the movable wall section in a closed position, means for moving the movable wall section toward an open position when the securing means is moved to an inoperative position, and cutting means adjacent the open end of the body.

3. A device of the character described comprising a tubular body having a head and a tubular wall portion closed at one end by said head, the wall portion having a stationary section rigid with the head and a movable section free from the head, a pin pivotally connecting the movable wall section with the stationary wall section adjacent the open end of said body and extending through the body to provide a cutter, a latching yoke for the movable wall section pivotally connected with the stationary wall section, and fingers carried by the latching yoke for engaging the movable wall section and moving the same toward an open position when the latching yoke is moved to release the movable wall section.

4. A device of the character described comprising a tubular body having a head and a tubular wall portion closed at one end by said head, the wall portion having a stationary section rigid with the head and a movable section free from the head and having its upper end portion fitting against the edge face of the head and its side portions extending in overlapping relation to the sides of the stationary section and in cross section tapering inwardly and outwardly to provide cam faces, and means for releasably holding the movable wall section in a closed position.

5. The structure of claim 4 having the movable wall section above the cam faces provided with flat edge faces and the securing means for the movable wall comprising a yoke pivotally connected with the stationary wall section and terminating in finger extensions for engaging said flat faces and moving the movable wall section to an open position.

6. A device of the character described comprising a tubular body open at one end and having a head and walls carried thereby, the walls having a stationary section rigid with the head and a movable section movable into and out of a closed position, one of the wall sections having longitudinally extending cam surfaces for providing a space between the body and a mass of material when the body is thrust into the mass of material and turned, and means for releasably holding the movable wall section in a closed position.

7. A device of the character described comprising a tubular body open at one end and having a head and walls carried thereby, the walls having longitudinally extending cam surfaces for providing a space between the body and a mass of material when the body is thrust into the mass of material and turned and means extending transversely through the open end portion of the body for severing material in the body from the main mass thereof when the body is thrust into the mass and turned.

8. A device of the character described comprising a tubular body open at its lower end and having a closure head at its upper end, the walls of the body having one section movable to an open position and the walls having an internal receptacle supporting ledge adjacent its open end, a plunger slidably passing through said head, and means swiveled upon the inner end of the plunger for engaging a receptacle in the body and forcing the same against the supporting ledge when the plunger is moved inwardly.

9. A device of the character described comprising a tubular body open at its lower end and having internal receptacle supporting means adjacent its open end and having a wall section movable to an open position, a plunger extending into the body through the closed end thereof, and receptacle engaging means swiveled to the inner end portion of said plunger whereby the plunger and body may have rotary movement with the receptacle engaging means and a receptacle engaged thereby remaining stationary.

10. A device of the character described comprising a tubular body open at its lower end and having internal receptacle supporting means adjacent its open end and having a wall section movable to an open position, a plunger extending into the body through the closed end thereof, receptacle engaging means connected with the inner end portion of said plunger, and puncturing means carried by the receptacle engaging means for puncturing the bottom of a receptacle engaged thereby.

11. The structure of claim 10 having the puncturing means provided with an external air passage extending longitudinally of the puncturing means and in the form of a spiral.

12. The structure of claim 10 having the puncturing means carried by blocks screwed into openings in the receptacle engaging means.

13. The structure of claim 10 having the puncturing means in the form of a punch having a longitudinally extending air passage.

14. The structure of claim 10 having the puncturing means in the form of a punch and a carrier for the punch removably carried by the receptacle engaging means.

15. The structure of claim 9 having the plunger slidably mounted in a tubular neck carried by the head of said body, the neck and plunger being each provided with a handle at its outer end, and a spring positioned about the plunger between said handles to yieldably hold the plunger and receptacle engaging element in a raised position.

16. The structure of claim 9 having the plunger held against rotary movement in the head but permitted of free sliding movement.

17. A device of the character described comprising a tubular body open at its lower end and having internal receptacle supporting means adjacent its open end and having a wall section movable to an open position, a plunger extending into the body through the closed end thereof, receptacle engaging means connected wtih the inner end portion of said plunger, and a U-shaped securing yoke for the movable wall section having its end portions pivotally connected with the body, the yoke having a finger engaging extension intermediate its length and extensions at its ends for engaging the movable wall section and moving the same to an open position when the yoke is swung upwardly to an open position.

18. A device of the character described comprising a tubular body open at its lower end and having internal receptacle-supporting means adjacent its open end and having a wall section movable to an open position, a plunger extending into the body through the closed end thereof, receptacle engaging means connected with the inner end portion of said plunger, and means carried by the receptacle-engaing means for puncturing a receptacle engaged thereby when the plunger is moved inwardly to force the receptacle against the receptacle supporting means.

In testimony whereof I have hereunto set my hand.

WILLIAM H. SHAFFER.